US006917652B2

(12) United States Patent
Lyu

(10) Patent No.: US 6,917,652 B2
(45) Date of Patent: Jul. 12, 2005

(54) DEVICE AND METHOD FOR DECODING VIDEO SIGNAL

(75) Inventor: Hwa Young Lyu, Seoul (KR)

(73) Assignee: LG Electronics, Inc., Seoul (KR)

( * ) Notice: Subject to any disclaimer, the term of this patent is extended or adjusted under 35 U.S.C. 154(b) by 1106 days.

(21) Appl. No.: 09/757,664

(22) Filed: Jan. 11, 2001

(65) Prior Publication Data

US 2001/0007576 A1 Jul. 12, 2001

(30) Foreign Application Priority Data

Jan. 12, 2000 (KR) .......................................... 2000-1414

(51) Int. Cl.[7] ................................................ H04N 7/12
(52) U.S. Cl. ................................. 375/240.25; 348/565
(58) Field of Search ....................... 375/240.25, 240.01; 348/565, 388.1, 385.1, 564

(56) References Cited

U.S. PATENT DOCUMENTS

| | | | | |
|---|---|---|---|---|
| 4,984,082 A | * | 1/1991 | Okamura .................... 348/565 |
| 5,502,494 A | * | 3/1996 | Auld ...................... 375/240.25 |
| 5,548,341 A | * | 8/1996 | Klink et al. ................. 348/565 |
| 5,623,308 A | * | 4/1997 | Civanlar et al. ........ 375/240.01 |
| 5,691,768 A | * | 11/1997 | Civanlar et al. ........ 375/240.01 |
| 6,311,155 B1 | * | 10/2001 | Vaudrey et al. ............. 704/225 |
| 6,393,196 B1 | * | 5/2002 | Yamane et al. ................ 386/52 |
| 6,469,744 B1 | * | 10/2002 | Pearlstein .................... 348/554 |
| 6,728,477 B1 | * | 4/2004 | Watkins ...................... 386/125 |

* cited by examiner

Primary Examiner—Chris Kelley
Assistant Examiner—Matthew Haney
(74) Attorney, Agent, or Firm—Fleshner & Kim, LLP

(57) ABSTRACT

Device and method for decoding a plurality of video bitstreams on the same time by using one decoder by making time multiplexing decoding of bitstreams in different frame rates and film modes in frames, which facilitates simultaneous processing of multiple video bitstreams for PIP, POP, multi-channel broadcasting, and the like by using, not numerous video decoder, but only one HD class video decoded, a required memory size can be reduced significantly, and an IC size can be reduced further if the present invention is applied to an ASIC, that enhances competitiveness.

15 Claims, 4 Drawing Sheets display : 60Hz interlaced scanning display
video 0 : 30Hz interlaced scanning frame picture top_field_first display : 60Hz interlaced scanning display
video 0 : 30Hz interlaced scanning frame picture top_field_first
video 1 : 30Hz interlaced scanning frame picture top_field_first display : 60Hz interlaced scanning display
video 0 : 30Hz interlaced scanning frame picture bottom_field_first
video 1 : 30Hz interlaced scanning frame picture top_field_first display : 60Hz interlaced scanning display
video 0 : 30Hz interlaced scanning frame picture top_field_first
video 1 : 60Hz progressive scanning frame picture

FIG. 6

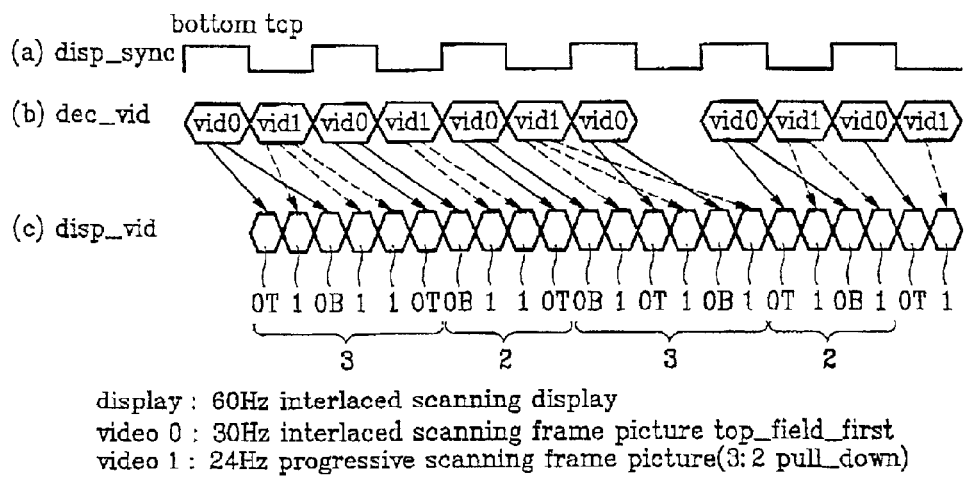

display : 60Hz interlaced scanning display
video 0 : 30Hz interlaced scanning frame picture top_field_first
video 1 : 24Hz progressive scanning frame picture(3:2 pull_down)

FIG. 7

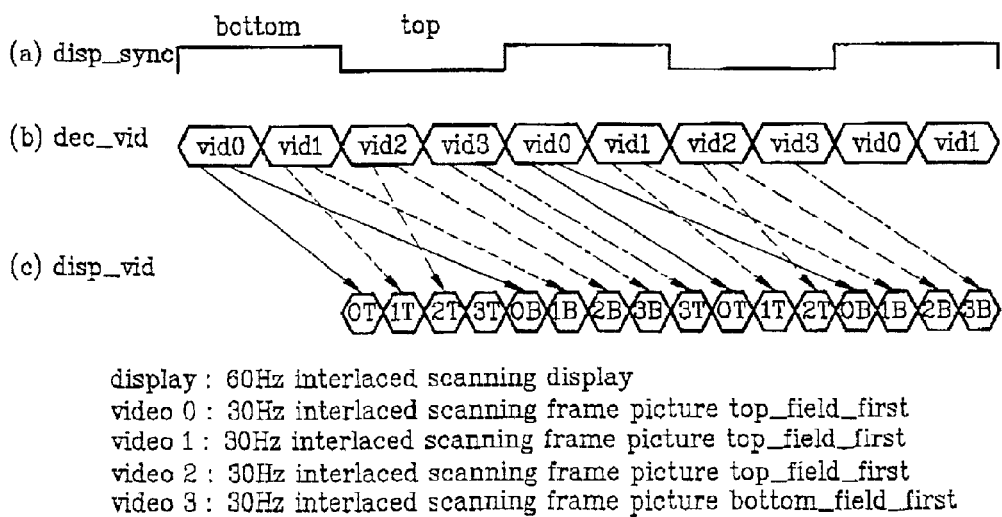

display : 60Hz interlaced scanning display
video 0 : 30Hz interlaced scanning frame picture top_field_first
video 1 : 30Hz interlaced scanning frame picture top_field_first
video 2 : 30Hz interlaced scanning frame picture top_field_first
video 3 : 30Hz interlaced scanning frame picture bottom_field_first

DEVICE AND METHOD FOR DECODING VIDEO SIGNAL

BACKGROUND OF THE INVENTION

1. Field of the Invention

The present invention relates to a Digital TV(DTV) receiver, and more particularly, to device and method for decoding a plurality of video bitstreams on the same time by using one decoder.

2. Background of the Related Art

The MPEG(Moving Picture Experts Group)-2 video standards are widely used in compressing, transmission or storage, and reproduction of a video signal in DTV, or DVD (Digital Versatile Disc). Particularly, in the DTV, an MPEG-2 video decoder is required to decode an HD(High Definition) class video of MP@HL levels which is implemented by one ASIC (Application Specific Integrated Circuit). Recently, in addition to this, a number of video decoders are used for implementing a variety of DTV display fictions, such as PIP(Picture In Picture) and POP (Picture Out Picture), and efforts for putting the numerous video decoders into one ASIC are also made. The PIP is display of at least one subpicture within one main picture, and the POP is display of at least one subpicture at left(or right) of the main picture.

However, the use of a number of video decoders as many as required for decoding a plurality of video bit streams increases, not only an IC area, but also a cost.

SUMMARY OF THE INVENTION

Accordingly, the present invention is directed to device and method for decoding a plurality of video bitstreams on the same time by using one decoder that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the video decoder includes a memory having a bitstream buffer area and a frame memory area, with each area divided again according to a number of video bitstreams to be decoded, for storing a plurality of received video bitstreams to respective areas, a single video decoding part for time multiplexing the plurality of video bitstreams received through the memory in fixed units, to decode the bitstreams, and storing respective areas of the memory, a multi-display controlling part for assigning a display number to every display frame of the video bitstream according to a frame rate and a film mode, reading a data decoded in synchronization to a display synchronization signal from the memory and forwarding in a time multiplexing fashion, and reducing the display number after the data is forwarded, and a multi-decoding controlling part for determining a video bitstream to be decoded at the present time among the plurality of video bitstreams according to a display state of the multi-display controlling part, and forwarding the video bitstream to the single video decoding part.

The video decoder further includes a sequence level header storage part having a plurality of sequence level header registers for the video bitstreams, for storing header information of the video bitstreams to respective sequence level header registers under the control of the multi-decoding controlling part.

The video decoder assigns a display number to every display frame of each of the video bitstreams according to frame rates and film mode signals, the multi-display controlling part outputs in a time multiplexing fashion matched to a display synchronization, display a display state with the display number reduced by one after the output, and the multi-decoding controlling part controls such that frames of the video bitstream displayed at the present time is decoded if the display number is known to be '0' or '1'.

The multi-display controlling part determines a field parity to be displayed at the present time of being matched with a field parity of a display synchronization signal, and does not reduce the display number, understanding that the display is repeated if the field parities are not matched for each bitstream, for decoding with the field parities matched if a source of the bitstreams are of interlaced scanning.

In another aspect of the present invention, there is provided a method for decoding a video signal, including the steps of (1) time multiplexing a plurality of video bitstreams in frames, to decode the bitstreams, (2) assigning a display number to every display frame of each of the video bitstreams according to a frame rate and a film mode, reading a data decoded in synchronization to a display synchronization signal from a memory and forwarding in a time multiplexing fashion, and reducing the display number, and (3) determining a video bitstream to be decoded at the present time among the plurality of video bitstreams according to a display state in the step (2).

In the step (2), the same video bitstream is displayed less than two times in one display synchronization, and a video bitstream to be displayed is determined in an order of a display number 1, a display number two or greater than 2, and a display number '0'.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
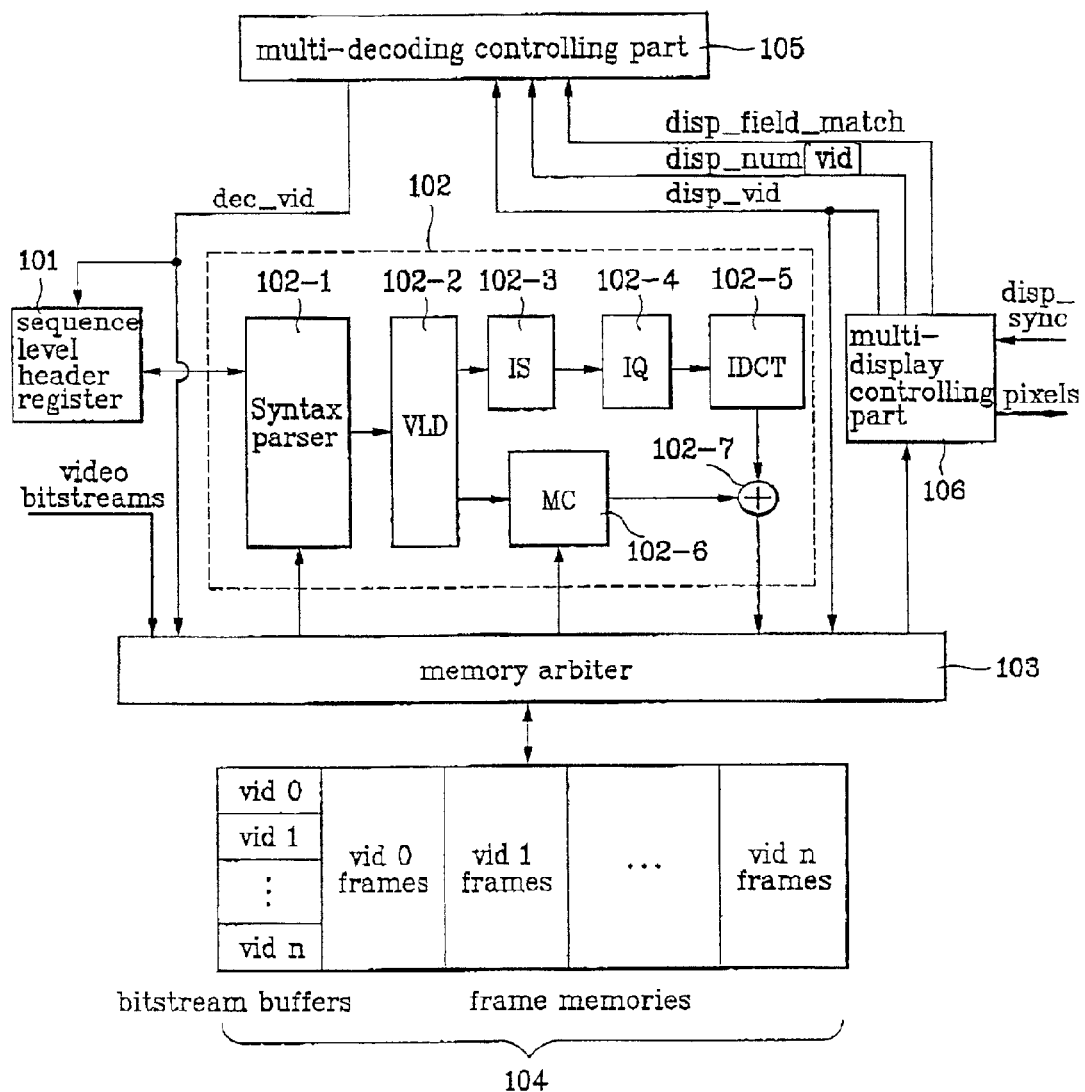
FIG. 1 illustrates a block diagram of a system of a video decoder in accordance with a preferred embodiment of he present invention; and, FIGS. 2~7 illustrate the timing diagrams showing operation examples of the video decoder in FIG. 1.
Figure 2:
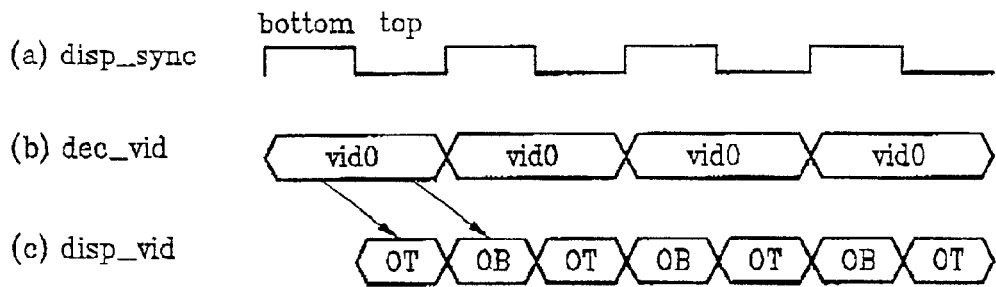
Figure 3:
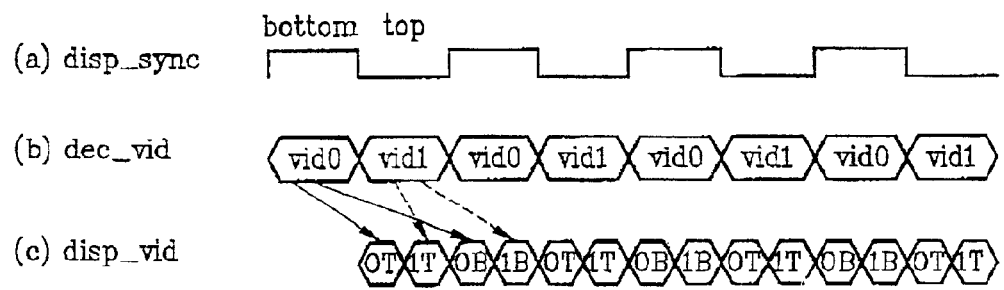
Figure 4:
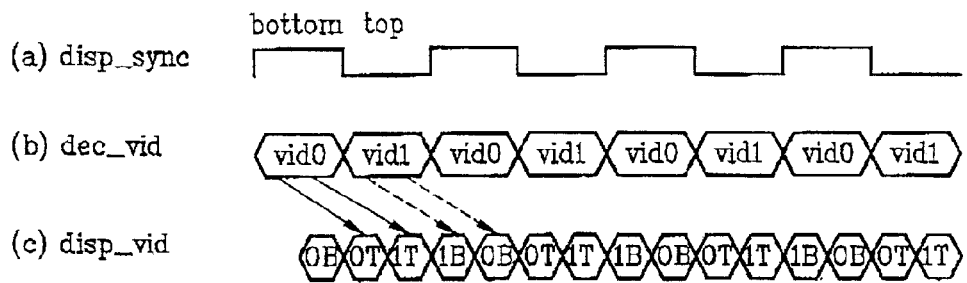
Figure 5:
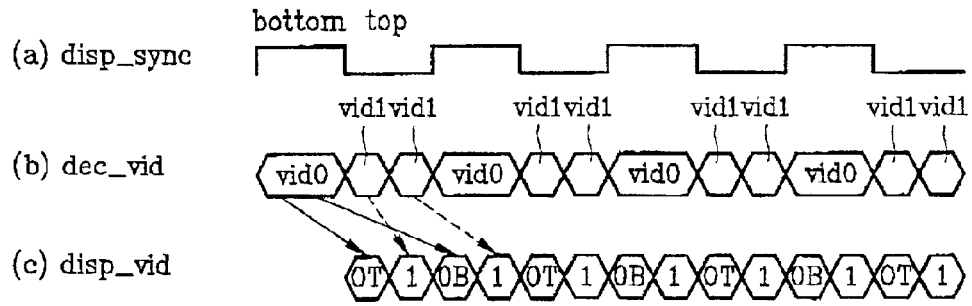

Reference will now be made in detail to the preferred embodiments of the present invention, examples of which are illustrated in the accompanying drawings. Currently, one video decoder is designed to decode only one video bit stream. Therefore, in a case when an SD (Standard Definition) class video is decoded by using a DTV video decoder which can decode an HD class video, only a portion of processing capability and a portion of memory of the DTV video decoder are used. The present invention suggests to make use of surplus processing capability and memory in the case of SD class video to decode a plurality of SD class videos on the same time by using one video decoder. FIG. 1 illustrates a block diagram of a system of a video decoder in accordance with a preferred embodiment of the present invention for carrying out such multi-decoding.

Referring to FIG. 1, the video decoder in accordance with a preferred embodiment of the present invention includes a sequence level header register 101, a single video decoding part 102, a memory arbiter 103, memories 104, a multi-decoding controlling part 105, and a multi-display controlling part 106. The single video decoding part 102, identical to a general MPEG video decoder, includes, for an example, a syntax parser 102-1, a VLD part(Variable Length Decoder) 102-2, an IS(Inverse Scan) part 102-3, an IQ part(Inverse Quantizer) 102-4, an IDCT(lnverse Discrete Cosine Transform) part 102-5, an MC (Motion Compensator) part 102-6, and an adder 102-7.

Upon reception of a vide bitstream through a bitstream buffer in the memory 104, the syntax parser 102-1 separates sequence level header information from the video bitstream, and stores in a relevant register in the sequence level header register, and forwards only a video bitstream of pure data information to the VLD 102-2 part. The VLD part 102-2 receives and subjects the video bitstream to separate the video bitstream into motion vectors, quantizing values, and DCT coefficients. As the DCT coefficients are coded in a zig zag scan method for transmission of the DCT coefficients starting from a low frequency component, the IS part 102-3 changes the zig zag scan to Raster scan. The IQ part 102-4 subjects the DCT coefficients, reversely scanned at and provided from the IS part 102-3, to inverse quantizing according to a quantizing value, and provides to the IDCT part 102-5. The IDCT part 102-5 subjects the inversely quantized DCT coefficients to IDCT, and provides to the adder 102-7, and the MC part 102-6 interpolates a prior fame data read from the memory 104 with the motion vector separated from the VLD part 11 and provides to the adder 102-7. The adder 102-7 adds the data subjected to IDCT to the motion compensated data, to restore a perfect data and store in a frame memory of the memory 104. The memory 104, having a general memory size good for decoding an HD class picture, is divided into a bitstream buffer region and a frame memory region, at large. Each region can be adaptively divided into 'n' subregions, a number of multi-decoded video bitstreams. 'Vid's(video index) represent numbers for marking the 'n' video bitstreams. Herein, one video bitstream has one program, and 'n' video bitstreams have a number of programs equal to or smaller than 'n'. That is, there can be duplication of programs in the 'n' video bitstreams. The memory arbiter 103 controls various data as shown in FIG. 1 to input/output to/from the memory 104 in a time multiplexing fashion. The multi-display controlling part 106 reads pixel values from the frame memory of a vid to be displayed presently in the memory 104 in response to a display synchronization disp_sync, and provides signals representing the present display states to the multi-decoding controlling part 105. The disp_sync denotes an external display frame synchronization, also indicating a field synchronization and a field parity when it is an interlaced scanning display. The present invention takes 60 Hz interlaced scanning display as an example, wherein a transition of disp_sync denotes a field synchronization. A synchronization waveform value denotes a field parity(top: 0, bottom: 1). A disp_vid represents a vid of a video bitstream under display, disp_num[vid] represents a number of times of the display frame of respective vids to be displayed and a disp_field_match represents if a display parity of the present display L frame is the same with a parity of the disp_sync. That is, in the present invention, in order to subject video streams of different frame rates and film modes to time multiplexing in frames in decoding the video bitstream, a display number disp_num[vid] is assigned to every display frame of each video bitstream according to the frame rate and film mode signal. Giving a first priority to a display frame of a display number one, the multi-display controlling part 106 provides the display frames in a time multiplexing fashion synchronized to the disp_sync, and reduces the disp_num[vid] by one after every display frame is provided, for indicating a display state. The multi-decoding controlling part 105 controls to decode frames of the video bitstream displayed presently if the disp_num[vid] is either 0 or 1. If the video bitstream is received in a 30 Hz interlaced scanning state and displayed in a 60 Hz interlaced scanning state, every display frame has the disp_num[vid] with an initial value 2 and a field display end value 1. If a prior field is displayed repeatedly owing to mismatch of field parities, the disp_num[vid] is also, not reduced, but maintained. The disp_num[vid] has a value varied both with an input format and display format. The multi-decoding controlling part 105 determines which one of 'n' video bitstreams is required to be decoded presently with reference to a state of the multi-display controlling part 106. The dec_vid is a vid of a video bitstream to be decoded presently. The sequence level header register 101 has individual sequence level header registers for respective video bitstreams, and reads/writes the sequence level header registers selectively by means of a dec_vid. That is, since the present invention subjects video bitstreams to time multiplexing in frames, header information on a sequence level is stored separately for each video stream.

The whole operation will be explained.

It is assumed that 'n' video bitstreams are provided to the memory arbiter 103 through signal input lines either simultaneously, or in time multiplex. The memory arbiter 103 stores the video bitstreams into respective bitstream buffer regions of the bitstream memory 104. The memory arbiter 103 controls the memory 104 to forward a video bitstream in a region of dec_vid to the syntax parsing part 102-1 in the single video decoding part 102 for syntax parsing and a reference fame data to the MC part 102-6 for motion compensation, and stores a five data, a resultant of the adder 102-7, i.e., a result of video decoding, to a relevant frame memory in the memory 104. The memory arbiter 103 reads a display frame data in a region the disp_vid indicates from the display same memory and forwards to the multi-display controlling part 106. At the end, the single video decoding part 102, which is designed to decode only one video bitstream, is made to decode a number of video bitstreams simultaneously in time multiplexing fashion in frames in response to the dec_vid from the multi-decoding controller 105 and the disp_vid from the multi-display controller 106. For an effective time multiplexing decoding, it is important to fix a rule for determining the dec_vid and the disp_vid. That is, the multi-decoding controlling part 105 determines the dec_in response to the disp_vid, the disp_num(vid), and the disp_field_match signals. Once decoding of one frame of a certain vid is completed, a next vid to be decoded is fixed. Rules applicable to this case are as follows.

i) disp_num(vid)=0 ii) a progressive scanning case (disp_num(vid)=1) and (disp_vid=vid)

iii) an interlaced scanning case (disp_num(vid)=1) and (disp_vid=vid) and (disp_field_match=1).

A case when one of the foregoing three rules are met is determined to be the next dec_vid. That is, the rule implies a search for a frame which can be decoded presently because no decoding of a frame is possible if a decoded frame is not displayed yet.

1) Since the case i) implies completion of display of the vid, a next fame can not be decoded, additionally.

2) The case ii) implies that the next frame can not be decoded because the frame under display is required to be displayed once more.

3) Though the case iii) is the same with the case ii), in the case of interlaced scanning frame, even field parities are matched in displaying the frame. Because it is required to display a frame repeatedly, if the field parities are not met with the disp_sync, it is required to determine a disp_field_match being 1 even if the frame is under display. That is, in a case a source of the video bitstream is of the interlaced scanning type data, in order to decode the frames with the parities matched, the multi-display controlling part 106 determines match of a field parity to be displayed presently and a field parity of the disp_sync for each video bitstream. If not matched, taking that the frame display is repeated, the disp_num(vid) is not reduced, and the multi-decoding controlling part 105 takes there is no frame displayed. Repeating the same process, decoding of the next frame is continued. The multi-display controlling part 106 determines the disp_vid according to the following series of rules.

1. Frames with the same 'vid' is not displayed two or more than twice in 1 disp_sync.
2. Frame with disp_num(vid)=1 is displayed at first.
3. Frame with disp_num(vid)≧2 is displayed.
4. Frame with disp_num(vid)=0 is displayed.

The first rule is provided for uniform time multiplexing of all video bitstreams before display. The second and third rules are provided for displaying frames remained with one display time earlier for emptying the memory earlier because, though frames each reed with two, or more than two display times are required to display the frame once more even after the frame is displayed once, the frame display fails to permit to decode the next frame of the same vid, since display of frames each remained with one display time permit to decode next frames of the same vid, stopping of decoding caused by display can be prevented. The fourth rule is provided for repeating display of a prior display frame when no display frame is available due to discontinuous video bitstream, or an error. The foregoing time multiplexing decoding in frames is possible because, in decoding of a video signal in MPEG video compression standard, a starting code and the frame memory causes no problem even if the frames are discontinuous. What is required is to keep storage of header information applicable to a sequence level. An additional size of the circuit caused by addition of the multi-decoding controlling part 105, the multi-display controlling part 106, the sequence level header register 101 for multi-decoding is negligible, there is almost no size increase caused by the present invention. Provided that the foregoing decoding and display rules are applied, a time multiplexing decoding of video bitstreams of any format is possible, that facilitates display of a plurality of pictures on the same time.

FIGS. 2~7 illustrate timing diagrams showing operation examples of the video decoder in FIG. 1, wherein (a) is for disp_sync, (b) is for dec_vid, (c) is for disp_vid, for 60 Hz interlaced scanning.

FIG. 2(a)~2(c) illustrate examples for decoding one video bitstream by the video decoder of the present invention, for a case the displayed video bitstream is 60 Hz interlaced scanning and the decoded video bitstream is a typical 30 Hz interlaced frame picture top_field_first. This case may be taken as a case of an ED class picture decoding. In this case, since the received video bitstream is frame pictures, the decoding is made during 2*disp_sync sections, and a disp_num is set to 2 initially at every display frame. The display is made for two times in fields, and a field parity is matched to disp_sync by using disp_field_match signal. In this instance, whenever display of one field is completed, a disp_num value is reduced by one.

FIGS. 3~6 illustrate four typical examples for decoding two video bitstream of different video formats by a video decoder. In comparison to the case of FIG. 2, this case may be a case when two SD class videos each of which requires processing load and memory size approx. ½ of the HD class video are decoded on the same time. Since the video bitstreams in FIGS. 3, and 4(a)~4(b) have the same frame rates, it can be noted that the video bitstreams are decoded and displayed alternately, except that the video bitstreams are displayed in cross in case of FIG. 4. In FIGS. 5(a)~5(c), it can be noted that, as decoded video bitstreams are of 30 Hz and 60 Hz, the video bitstream of 30 Hz is decoded once for every two times of decoding of the video bitstream of 60 Hz. Since the 60 Hz video bitstream is of progressive scanning, the 60 Hz video bitstream is displayed regardless of field parity. FIGS. 6(a)~6(c) illustrate substantially complicate display of 30 Hz and 24 Hz video bitstreams according to a multiplexing rule. In the case of 24 Hz video bitstream, disp_num is set to be 3 or 2 alternately for every display frame for display the 24 Hz video bitstream in 60 Hz video bitstream by making 3:2 pull down. Once a number of display times of each frame defined in the MPEG is set to disp_num, video bitstreams of any frame rates or film modes can be multiplexed exactly. FIGS. 7(a)~7(c) illustrate an example for decoding four video bitstreams by using the video decoder of the present invention. In comparison to the foregoing example, this case may be a case when four SD class videos each of which requires processing load and memory size approx. ¼ of the HD class video are decoded on the same time.

Thus, provided that the present invention is applied, a DTV video decoder which can decodes an HD class 1920*1080 30 Hz interlaced scanning videos can decode up to three SD class 720*480 60 Hz progressive scanning videos, or up to six SD class 720*480 30 Hz videos. Therefore, because methods substantially identical the ones shown in FIGS. 2~7, the present invention will not be limited by the ones shown in FIGS. 2~7.

If it is desired to have the bitstreams, not time multiplexed, but processed in parallel by using the video decoder of the present invention, it is required to assign, four frame memories to the decoding, instead of the three frame memories required basically for decoding each bitstream. That is, if each video bitstream is decoded by using three frame memories, the multi-display controlling part 106 can only subject the video bitstreams to time multiplexing, but if each video bitstream is decoded by using more than four frame memories, the multi-display controlling part 106 c subject the video bitstreams, not only to time multiplexing, but also to parallel processing.

As has been explained, the device and method for decoding a plurality of video bitstreams on the same time by using one decoder of the present invention have the following advantages.

By making time multiplexing decoding of bitstreams in different frame rates and film modes in frames, which facilitates simultaneous processing of multiple video bitstreams for PIP, POP, multi-channel broadcasting, and the like by using, not numerous video decoder, but only one HD class video decoder, a required memory size can be reduced significantly, and an IC size can be reduced further if the present invention is applied to an ASIC, that enhances competitiveness. Since a number of bitstreams which can be decoded simultaneously can be adjusted flexibly as much as desired if a processing capacity and a memory size allowed, the present invention may be a variety of applications.

It will be apparent to those skilled in the art tat various modifications and variations can be made in the device and method for decoding a plurality of video bitstreams on the same time by using one decoder of the present invention without departing from the spirit or scope of the invention. Thus, it is intended that the present invention cover the modifications and variations of this invention provided they come within the scope of the appended claims and their equivalents.

What is claimed is:

1. A video decoder comprising:
   a memory having a bitstream buffer area and a frame memory area, with each area divided again according to a number of video bitstreams to be decoded, for storing a plurality of received video bitstreams to respective areas;
   a single video decoding part for time multiplexing the plurality of video bitstreams received through the memory in fixed units, to decode the bitstreams, and storing respective areas of the memory;
   multi-display controlling part for assigning a display number to every display frame of the video bitstream according to a frame rate and a film mode, reading a data decoded in synchronization to a display synchronization signal from the memory and forwarding in a time multiplexing fashion, and reducing the display number after the data is forwarded; and,
   a multi-decoding controlling part for determining a video bitstream to be decoded at the present time among the plurality of video bitstreams according to a display state of the multi-display controlling part, and forwarding the video bitstream to the single video decoding part.

2. A video decoder as claimed in claim 1, further comprising a sequence level header storage part having a plurality of sequence level header registers for the video bitstreams, for storing header information of the video bitstreams to respective sequence level header registers under the control of the multi-decoding controlling part.

3. A video decoder as claimed in claim 1, wherein the single video decoding part makes time multiplexing of the plurality of received video bitstreams in frames, and decodes simultaneously under the control of the multi-display controlling part and the multi-decoding controlling part.

4. A video decoder as claimed in claim 1, wherein the multi-decoding controlling part determines a vid(dec_vid) of a frame to be decoded next upon completion of decoding one frame of a certain vid(vid denotes a video index, a number used for marking 'n' video bitstreams), wherein the next dec_vid is fixed if one of the following rules are met.
   i) display of frames of the vid is completed already,
   ii) the frame under display is required to be displayed once more and a source of the video bitstream is of progressive scanning,
   iii) the frame under display is required to be displayed once more, a source of the video bitstream is of interlaced scanning, and a field parity is matched with disp_sync(disp_sync denotes a display frame synchronization).

5. A video decoder as claimed in claim 1, wherein the multi-display controlling part displays the same video bitstreams in one display synchronization less than two times, and a video bitstream to be displayed is determined in an order of a display number 1, a display number two or greater than 2, and a display number '0'.

6. A video decoder as claimed in claim 1, wherein the multi-display controlling part determines a field parity to be displayed at the present time is matched with a field parity of a display synchronization signal for each video bitstream, for not reducing the display number if the field parities are not matched.

7. A video decoder as claimed in claim 1, wherein the multi-display controlling part controls to determine match of a field parity to be displayed at the present time with a field parity of a display synchronization signal for each video bitstream, for repeating a prior field if the field parities are not matched.

8. A video decoder as claimed in claim 1, wherein the multi-display controlling part can make parallel processing if more than four frame memories are used for each of the bitstreams.

9. A method for decoding a video signal, comprising the steps of:
   (1) time multiplexing a plurality of video bitstreams in frames, to decode the bitstreams;
   (2) assign a display number to every display frame of each of the video bitstreams according to a frame rate and a film mode, reading a data decoded in synchronization to a display synchronization signal from a memory and forwarding in a time multiplexing fashion, and reducing the display number; and,
   (3) determining a video bitstream to be decoded at the present time among the plurality of video bitstreams according to a display state in the step (2).

10. A method as claimed in claim 9, wherein in the step (2), the same video bitstream is displayed less than two times in one display synchronization, and a video bitstream to be displayed is determined in an order of a display number 1, a display number two or greater than 2, and a display number '0'.

11. A method as claimed in claim 9, wherein the step (2) includes the step of determining a field parity to be displayed at the present time of being matched with a field parity of a display synchronization signal for each video bitstream, for not reducing the display number if the field parities are not matched.

12. A video decoder as claimed in claim 9, wherein the step (2) further includes the step of determining match of a field parity to be displayed at the present time with a field parity of a display synchronization signal for each video bitstream, for repeating a prior field if the field parities are not matched.

13. A video decoder as claimed in claim 9, wherein-the step (2) further includes the step of decoding frames of the bitstream display of which is ended with reference to the display to numbers of the bitstreams at a next time.

14. A video decoder as claimed in claim 9, wherein the step (2) further includes the step of decoding frames of the bitstream being displayed at the present time if display of the bitstream is required once more with reference to the display numbers of the bitstreams.

15. A video decoder as claimed in claim 14, wherein the step (2) further includes the step of decoding a next frame of the video bitstream only when a field parity to be displayed at the present time is matched with a field parity of a display synchronization signal for each video bitstream if a source of the video bitstream is of interlaced scanning.

* * * * *